United States Patent [19]

Atwood

[11] Patent Number: 5,573,788
[45] Date of Patent: Nov. 12, 1996

[54] MEASURING CUP APPARATUS FOR DOUGH DIVIDER

[75] Inventor: Thomas A. Atwood, Dolton, Ill.

[73] Assignee: AM Manufacturing Company, Inc., Dolton, Ill.

[21] Appl. No.: 451,041

[22] Filed: May 25, 1995

Related U.S. Application Data

[63] Continuation of Ser. No. 217,855, Mar. 25, 1994, abandoned.

[51] Int. Cl.⁶ ............................................. A21C 5/02
[52] U.S. Cl. .................... 425/238; 425/240; 425/448; 425/449
[58] Field of Search ............................. 425/238, 240, 425/544, 398, 239, DIG. 228, DIG. 131, 447, 448, 449; 16/85, 86, 86 A

[56] References Cited

U.S. PATENT DOCUMENTS

| | | | |
|---|---|---|---|
| 1,270,097 | 6/1918 | Baker | 425/240 |
| 1,738,935 | 12/1929 | Streich | 425/240 |
| 1,757,099 | 5/1930 | Streich | 425/238 |
| 2,449,687 | 9/1948 | Brinde | 76/85 |
| 2,479,597 | 8/1949 | Anton | 16/86 |
| 3,311,068 | 3/1967 | Atwood et al. | |
| 3,349,438 | 10/1967 | Baker et al. | 425/238 |
| 3,364,879 | 1/1968 | Atwood | |
| 3,578,218 | 5/1971 | Atwood | |
| 4,218,807 | 8/1980 | Snow | 16/86 A |
| 5,290,167 | 3/1994 | Tanaka et al. | 425/397 |

*Primary Examiner*—Khanh P. Nguyen
*Attorney, Agent, or Firm*—Hill, Steadman & Simpson

[57] ABSTRACT

An improved dough divider is provided which has a measuring cup assembly for dividing a mass of dough into uniform smaller slugs. The apparatus is adjustable so that size of the dough slugs can be increased or decreased. The dough divider has a piston-cylinder arrangement for supplying a flow of dough. The measuring cup assembly has a cylindrical housing which has a central axis. A plunger aligned on the axis so that it can reciprocate axially within the housing. An elongated stud is threaded through the housing so that the stud is aligned axially with a stem of the plunger. The plunger slides in said housing when dough is pressed against the plunger face, such that the plunger stem can contact the stud to limit the sliding of the plunger.

18 Claims, 3 Drawing Sheets

MEASURING CUP APPARATUS FOR DOUGH DIVIDER

This is a continuation of application Ser. No. 08/217,855, filed Mar. 25, 1994 now abandoned.

BACKGROUND OF THE INVENTION

The present invention generally relates to dough processing machines. More specifically, the invention relates to a machine that divides a mass of dough into smaller uniform quantities. The invention provides an improvement to such a machine.

For producing baked products in large quantities, bakeries use machinery for automating various processes. For instance, various equipment is used for manipulating dough. One such machine is a dough divider, which apportions a large quantity of dough into slugs of smaller, uniform amounts of dough. These slugs of dough can then be formed and cooked into bagels, rolls, pitas, pizza crusts or a variety of other baked goods.

A dough divider can be arranged with other equipment. For example, a dough divider can be arranged so that the output goes into a dough rounder, which forms a slug of dough into a rounded shape. Slugs of dough can also be placed in a roller device for shaping bagels. Conveyor belts are often used for carrying dough from one machine to another for performing various processes.

A dough divider has a means for pumping dough from a reservoir into a measuring cup apparatus. Traditional dough dividers have a piston and cylinder arrangement which draws dough into the cylinder on a piston downstroke. The piston then pushes the dough into a measuring chamber from which a measured amount of dough, or slug, is removed. The process repeats, dividing dough into multiple smaller, uniform slugs.

Traditionally, the measuring chamber is provided by a measuring cup assembly which has a spring-biased plunger slidable within a cylindrical housing. The plunger generally has a face which forms a moveable wall within the housing to define the measuring chamber. A stem extends axially perpendicularly from the plunger face opposite the measuring chamber.

The plunger travel must be limited by a stopping mechanism so that the measuring chamber has a consistent volume. In known dough dividers, the stopping mechanism has been an stop cup, or sleeve-like member fitted over the exterior of the housing. Plunger travel stops when the plunger stem contacts the stop cup. The stop cup is traditionally slidably adjustable over the housing exterior. The setting of the stop cup determines the amount of plunger travel and thus the size of a slug of dough to be produced.

To secure the stop cup in a desired position, a slot has been provided along the side of the stop cup through which a threaded member extends from the cylindrical housing. A wing nut is provided on the threaded member, so that the stop cup position can be locked by tightening the wing nut.

Also, when the wing nut is loosened, the position of the stop cup can be adjusted by turning a threaded shaft which is threaded through the stop cup and contacts the housing. The threaded shaft is aligned on an axis parallel to the axis of the cylindrical housing although the shaft is offset from the axis of the housing so that it does not interfere with the path of a plunger stem which contacts the stop cup at a point central to the stop cup. The threaded shaft can be fitted with a crank for an operator to turn.

The traditional measuring cup assembly described above has been known to come out of adjustment during use of the dough divider. The wing nut locking contact is positioned on the side of the stop cup, but the plunger contacts the stop cup at a central, axial point on each cycle of the divider. Thus, the contact from the plunger tends to wedge the stop cup at an angle. Also, if an operator does not sufficiently tighten the wing nut, the stop cup quickly works its way out of position, resulting in a larger than desired volume of dough being received in the measuring chamber. Furthermore, if an operator turns or bumps into the crank on the threaded shaft while the wing nut is tightened, the stop cup is further misaligned and misadjusted.

Therefore, a need exists for an improved dough divider measuring cup assembly that has an adjustable plunger stopping mechanism which remains locked in position during operation of the dough divider. A need also exists for an improved dough divider measuring cup assembly that has an adjustable plunger stopping mechanism that cannot become misaligned through operator misuse or from the cycling forces of the dough divider. A further need exists for a dough divider measuring cup assembly that is simple for an operator to use. Yet another need exists for a dough divider measuring cup assembly which is simple in design and has few parts.

SUMMARY OF THE INVENTION

The present invention provides a system and method for adjusting the measuring cup assembly of a dough divider which overcomes the deficiencies of the prior art. In this regard, the present invention includes an axially positioned adjustment mechanism which securely locks in position. The apparatus of the present invention is also simple in design.

To this end, in an embodiment of the present invention, an improvement is provided to a dough dividing machine having a reciprocating piston for incrementally pumping predetermined amounts of dough. The machine also has a measuring cup assembly for receiving the predetermined amount of dough which has a housing with a central axis. A plunger is slidable axially within said housing. The improvement to the machine is a stopping mechanism secured at the axis of the housing for contacting the plunger to limit motion of the plunger.

In an embodiment, the stopping mechanism is a threaded stud aligned along the axis and threadably secured to the housing.

In an embodiment, a resilient bushing is secured to the plunger for contacting the stud.

In an embodiment, a lock knob is threaded to the stud externally to the housing to lock the stud in a position.

In an embodiment, a crank handle is secured to an end of the stud.

In an embodiment, the plunger is disposed in a measuring cylinder and the plunger is biased to press dough out of the measuring cylinder.

In an embodiment, the housing comprises a plunger guide mount and a stop cover section. The plunger guide section, the end section and a measuring cylinder are secured together in a stacked relationship on a common axis. The plunger has a stem which passes through a wall of the plunger guide section into the stop cover section. A spring is disposed around a stem of the plunger such that the spring is in compression between a face of the plunger and the plunger guide.

In an embodiment, the measuring cup assembly is mounted to a slide for positioning the measuring cup assembly to dispense the amount of dough.

In another embodiment, a dough divider is provided having a means for pumping dough. A housing having a central axis and a measuring chamber is also provided. A plunger is slidable within the housing along the axis for receiving a predetermined quantity of dough in the measuring chamber. A stud is aligned along the axis and secured to the housing at the axis so the plunger can contact the stud when the plunger slides in said housing.

In yet another embodiment, a dough divider is provided having a means for supplying a flow of dough. A cylindrical housing having an axis is also provided. A plunger having a face and a stem is arranged so that the stem is aligned along the axis to allow the plunger to reciprocate axially within the housing. An elongated stud is threaded through the housing so that the stud is aligned axially with the stem. The plunger slides in the housing when dough is pressed against the plunger face, such that the plunger stem can contact the stud to limit the sliding of the plunger.

An advantage of the present invention is that it provides an adjustment mechanism for a dough divider measuring cup assembly which is not jarred out of position during operation of the dough divider.

A further advantage of the present invention is that it provides an adjustable measuring cup assembly that is simple in design and has relatively few parts.

Another advantage of the present invention is that it provides an adjustable measuring cup assembly which is simple for an operator to use.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

In accordance with the invention described with reference to accompanying figures wherein like numerals designate like parts, the present invention provides an improved measuring cup assembly for a dough divider. The apparatus of the present invention provides a means for adjusting the output of a dough divider, having a locking means which retains its position during use.

Figure 1:
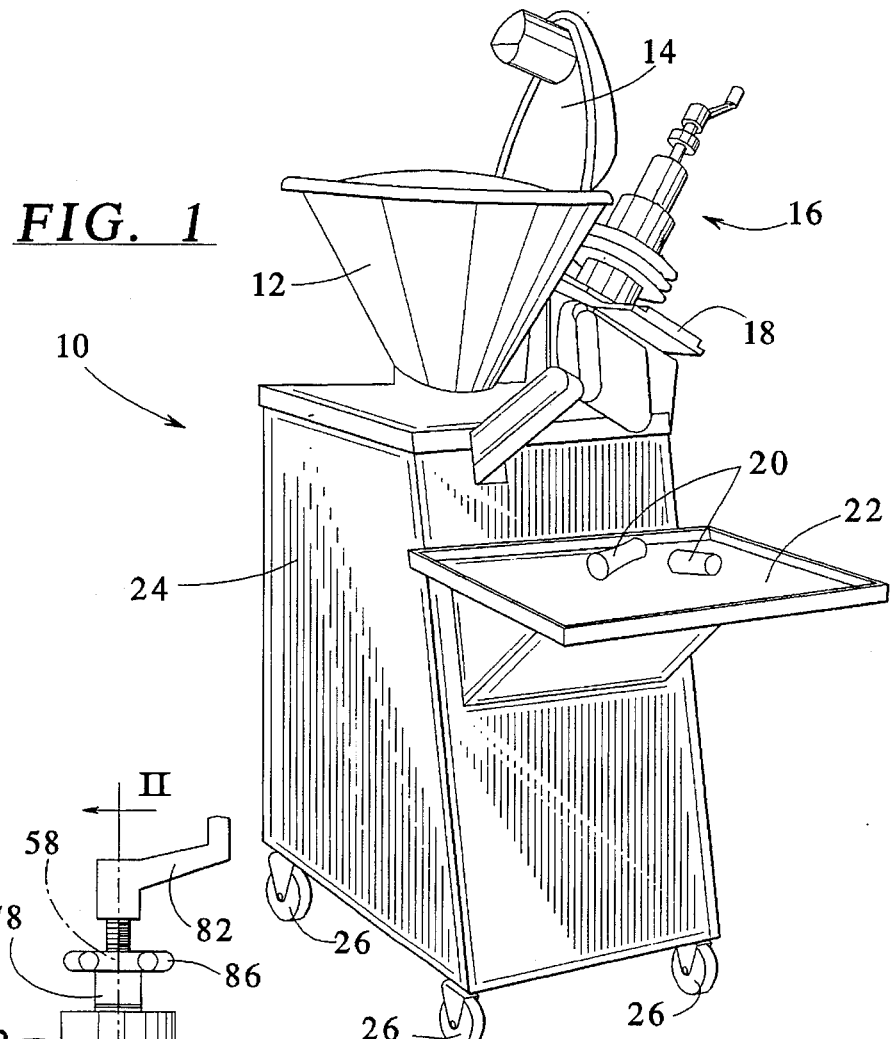
FIG. 1 is a perspective view of a dough divider embodying the present invention.

FIG. 1 illustrates a dough divider 10 which embodies the features of the present invention. A reservoir in the form of a hopper 12 is provided for holding a large quantity of dough. The hopper 12 has a hinged cover 14. Also illustrated in FIG. 1 is a measuring cup assembly 16. The measuring cup assembly 16 is mounted on a slide 18. During operation, uniform slugs 20 of dough are released from the measuring cup assembly 16. In the embodiment shown, the slugs 20 are collected on a tray 22. Alternatively, the slugs 20 could be dropped from the measuring cup assembly 16 onto a conveyor belt which could carry them to another processing machine (not shown). The slugs 20 are small relative to the amount of dough that can be placed in the hopper 12.

Some operating parts of the dough divider 10 are enclosed in a cabinet 24. Wheels 26 are provided on the cabinet 24 for moving the divider 10.

Figure 2:
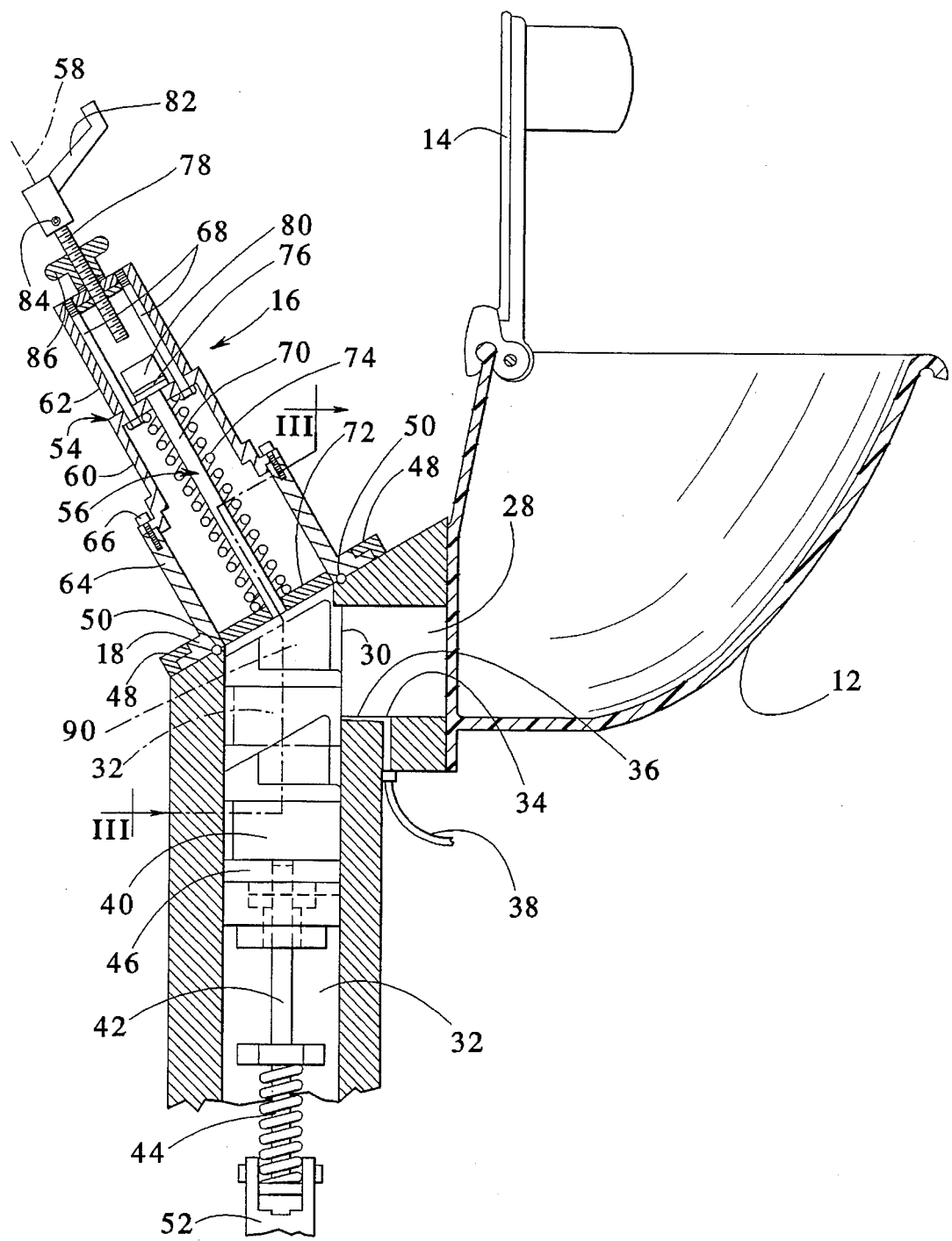
FIG. 2 is a partial side sectional view taken generally along line II—II of FIG. 3.

Turning to FIG. 2, the divider 10 is illustrated in greater detail. The bottom of the hopper 12 is formed to enter a passage in the form of a tube 28. The hopper 12 is shown holding dough. The tube 28 terminates at an opening 30 to a chamber such as a cylinder 32. The hopper 12 is thus in communication with the cylinder 32. The cylinder 32 is preferably aligned vertically, and the tube 28 is preferably aligned perpendicularly to the cylinder 32. The cylinder 32, tube 28 and hopper 12 are preferably made of metal.

Lubrication is preferably provided by a lubrication port 34 and channel 36 located in the tube 32. The channel 36 extends from the port 34 to the opening. A lubricant is provided under pressure via a supply line 38. The lubricant prevents dough from sticking in the divider 10. Preferably, the lubricant is an edible mineral oil.

A piston 40 is slidable within the cylinder 32. The piston 40 is preferably made of plastic. The piston 40 is secured to a connecting rod 42. The connecting rod 42 preferably has a spring biased telescoping section 44. A piston ring 46 is disposed around the piston 40, forming a seal between the piston 40 and the cylinder 32.

The measuring cup assembly 16 is mounted to the slide 18 which is secured to the divider 10 by bars 48 having an L-shaped cross-section. Slide seals 50 are positioned between the slide 18 and the cylinder 32. The measuring cup assembly 16 is preferably mounted at an angle to the cylinder 32.

The piston ring 46 and slide seals 50 make the cylinder 32 air tight. The dough in the hopper 12 forms an air tight seal around the tube 28. In operation, a linkage 52 causes the connecting rod 42 and piston 40 to reciprocate up and down within the cylinder 32.

As the piston 40 travels downward, a vacuum is formed, drawing dough from the hopper 12 through the tube 28 into the cylinder 32. When the piston 40 is in its bottommost position, the entire cylinder 32 is filled with dough. The piston 32 then travels upward, pushing dough through the cylinder 32 toward the measuring cup assembly 16.

The measuring cup assembly 16 includes a housing 54 and an axially moveable plunger 56. The housing 54 has a central axis 58 and is preferably cylindrical. The housing 54 can be made of multiple sections for ease of production and assembly. As illustrated in FIG. 2, the housing comprises a plunger guide 60 and a stop cover 62 secured together. The plunger guide 60 and stop cover 62 are secured to a measuring cylinder 64 in a stacked arrangement and commonly aligned on the axis 58. The measuring cylinder 64 is mounted to the slide 18. The plunger guide 60 is secured to the measuring cylinder 64 by screws 66. Also, the stop cover 62 is secured to the plunger guide 60 by long screws 68 which extend from the end of the stop cover 62 to the plunger guide 60.

Figure 3:
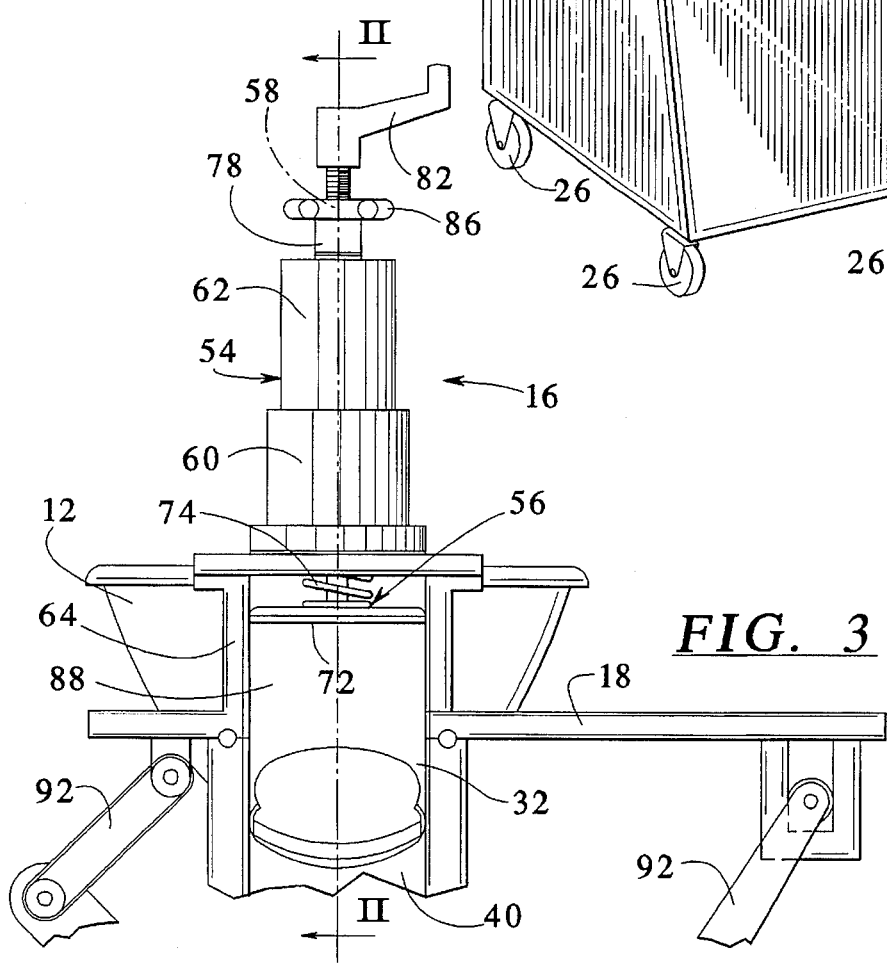
FIG. 3 is a partial rear sectional view taken generally along line III—III of FIG. 2.

The plunger 56 has a stem 70 and a face 72. The plunger 56 can slide axially within the housing 54 and is biased by a coil spring 74 so that the plunger face 72 is normally flush with the top of the cylinder 32, as illustrated in FIG. 2. The plunger 56 can recede in the housing 56 against the force of the spring 74, as illustrated in FIG. 3.

The plunger stem 70 extends through a wall of the plunger guide 62. A nut 76 having a width larger than the diameter of the plunger stem is threaded to the plunger stem 70 so that the plunger 56 is secured within the housing 54. The nut 76 contacts the wall of the plunger guide 62 when the plunger 56 is fully extended, as shown in FIG. 2.

The coil spring 74 is positioned around the plunger stem 70. The spring 74 is in compression between the plunger face 72 and the wall of the plunger guide 60. This biases the plunger 56 in the fully extended position.

The plunger face 72 is complementarily shaped to fit within the measuring cylinder 64 and is generally the shape of a cross-section of the measuring cylinder 64. A force acting on the plunger face 72 causes the plunger 56 to recede.

The plunger 56 travel is limited. An elongated stud 78 is threaded through a wall of the stop cover 62. Furthermore, the stud 78 is aligned along the axis 58 of the housing. Travel of the plunger 56 is limited by contact with the stud 78. Preferably, a bushing 80 is secured to the plunger stem 70 for contacting the stud 78. The bushing 80 is preferably made of a resilient material such as a plastic.

Because the stud 78 is secured at the end of the housing 54 at the stop cover 62 and secured in axial alignment with the housing 54, an impact force from the plunger 56 is transmitted evenly through the housing 54. Thus, non-axial force effects are minimized so that the stud 78 and housing 54 are not wedged out of adjustment.

A crank 82 is connected to an end of the stud 78 outside of the stop cover 62. Preferably, the crank 82 fits over the stud 78 and is held in place by a set screw 84. The axial position of the stud 78 can be changed by turning the crank 82. When a desired position is reached, the stud 78 can be secured in position by a lock knob 86 which is threaded thereon. The lock knob 86 is tightened against a retaining washer 88 which contacts the stop cover 62. The lock knob 86 is preferably star-shaped so that it can be gripped by an operator's hand.

As the dough is pressed upward by the piston 32, pressure from the dough causes the plunger 56 to travel against the force of the spring 74. When the plunger 56 is pressed by dough into a fully receded position, as in FIG. 3, such that the bushing 80 contacts the stud 78, a measuring chamber 88 is formed of the volume of the measuring cylinder 64 bounded by the plunger face 72. A slug 20 of dough is the amount of dough that fills the measuring chamber 88. An operator can adjust the measuring chamber 88 by turning the stud 78 to achieve the desired slug 20 size.

When the measuring chamber 88 has filled with dough, the piston 40 continues its travel, forcing excess dough to flow backward out of the cylinder 32, through the tube 28, into the hopper 12.

The piston 40 has a top which is angled to affect a slicing action on the dough as the piston 40 moves upward past the opening 30 to the tube 28. The piston 40 has a reduced-circumference section 90 near the top of the piston, adjacent to the opening 30. The reduced-circumference section 90 provides a flow path for the excess dough to escape from the cylinder 32 into the tube 28 as the dough is being compressed by the piston 40. Furthermore, the reduced-circumference section 90 provides a degree of safety for an operator's fingers accidentally caught by the piston 40, preventing fingers from being severed.

The piston 40 travels upward to near the top of the cylinder 32. The linkage 52 may continue an upward travel for a short distance after the piston 40 has reached the top of its upstroke. This additional travel by the linkage 52 is absorbed by the telescoping section 44 of the connecting rod 42. This overtravel ensures that a sufficient volume is pressed into the measuring cup assembly 16.

Figure 4:
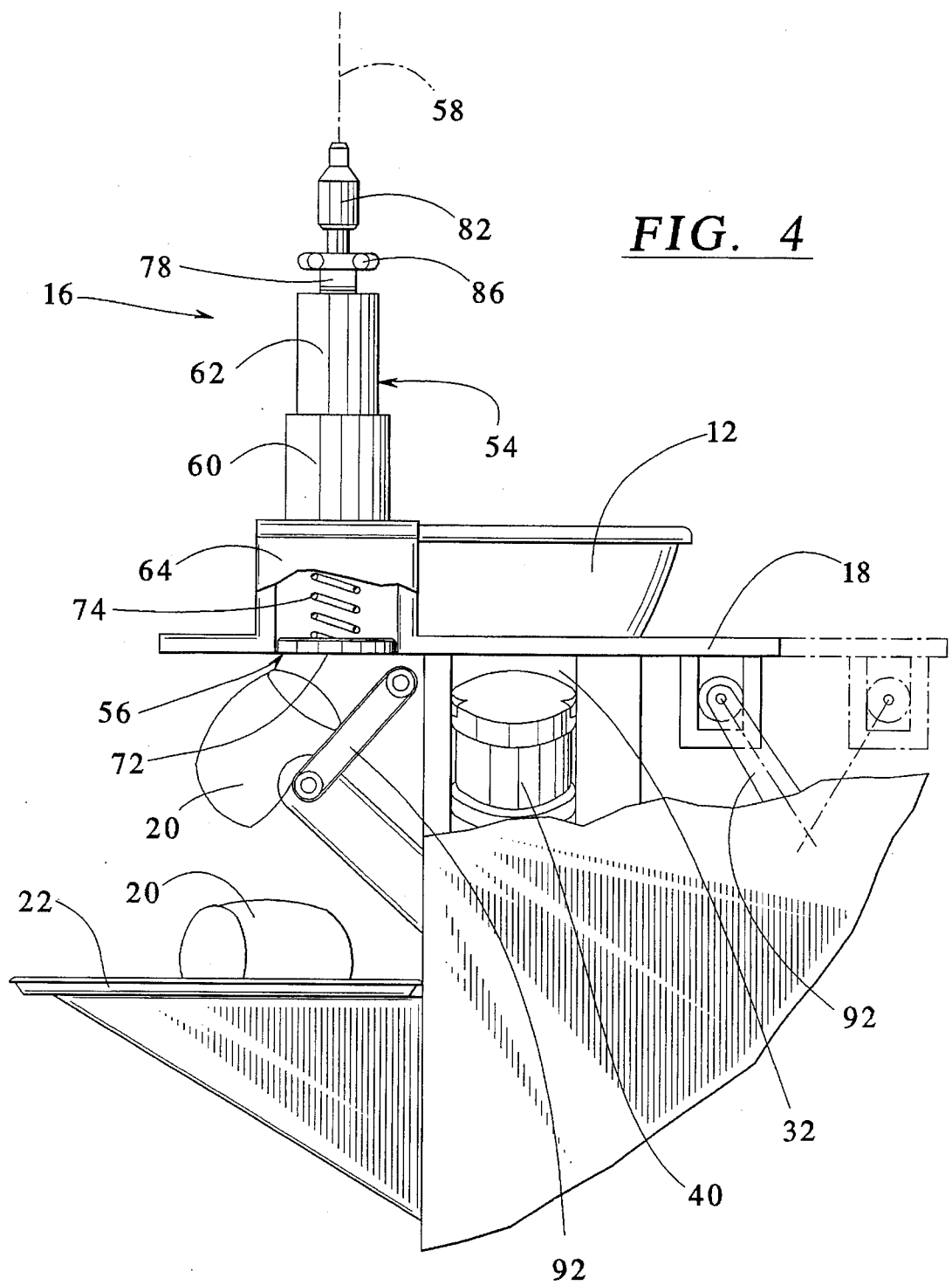
FIG. 4 is a partial rear plan view with portions broken away.

While the piston 40 is positioned at the top of the cylinder 32, the slide 18 is moved laterally by mechanized arms 92 to a position which opens the bottom of the measuring cylinder 64, as illustrated by FIG. 4. The spring 74 forces the plunger 56 to its fully extended position, dispensing the measured slug 20 of dough. The slug 20 falls from the measuring cup assembly 16 to a receptacle, such as the tray 22. The slide 18 is then moved back, so that the measuring cup assembly 16 can receive more dough, repeating the process.

It should be understood that various changes and modifications to the presently preferred embodiment described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. In a dough dividing machine having a reciprocating piston for incrementally pumping predetermined amounts of dough and a measuring cup assembly for receiving said predetermined amount of said dough wherein said measuring cup assembly comprises a plunger guide, a stop cover, and a measuring cylinder having a common central axis and a plunger slidable axially within said plunger guide, the improvement comprising:

said plunger guide and said stop cover being secured together in a fixed and nonadjustable manner, and said plunger guide and said measuring cylinder being secured together in a fixed and nonadjustable manner, said stop cover having an interior surface defining a cover chamber, said plunger guide having an interior surface defining a plunger chamber and said measuring guide having an interior surface defining a measuring chamber;

a stopping mechanism secured at the axis of said stop cover for contacting said plunger Within said cover chamber to limit motion of said plunger within said measuring chamber and said plunger chamber; and a resilient bushing secured to said plunger for contacting said stopping mechanism Within said cover chamber.

2. The improvement according to claim 1 wherein said stopping mechanism is a threaded stud aligned along said axis and threadably secured to said housing.

3. The improvement according to claim 2 further comprising a lock knob threaded to said stud externally to said housing to lock said stud in a position.

4. The improvement according to claim 2 further comprising a crank handle secured to an end of said stud.

5. The improvement according to claim 1 wherein said plunger is disposed in a measuring cylinder and said plunger is biased to press dough out of said measuring cylinder.

6. The improvement according to claim 1 wherein said housing comprises:

a plunger guide section; and an stop cover section to which said stopping mechanism is secured;

wherein said plunger guide section, said stop cover section and a measuring cylinder are secured together in a stacked relationship on a common axis, wherein said plunger has a stem which passes through a wall of said plunger guide section into said stop cover section, and wherein a spring is disposed around a stem of said plunger such that said spring is in compression between a face of said plunger and said plunger guide section.

7. The improvement according to claim 1 wherein said measuring cup assembly is mounted to a slide for positioning said measuring cup assembly to dispense said amount of dough.

8. A dough divider comprising:

a means for pumping dough;

a measuring cup assembly formed of a stop cover, a plunger guide, and a measuring cylinder having a common central axis, said plunger guide and said stop cover being secured together in a fixed and nonadjustable manner, and said plunger guide and said measuring cylinder being secured together in a fixed and nonadjustable manner, said stop cover having an interior surface defining a cover chamber, said plunger guide having an interior surface defining a plunger chamber and said measuring guide having an interior surface defining a measuring chamber;

plunger slidable from within said measuring chamber of said measuring cylinder into said plunger chamber of said plunger guide along said axis for receiving a predetermined quantity of dough in said measuring cylinder;

an adjustable stud aligned along said axis and secured to said stop cover at said axis so said plunger can contact said stud when said plunger slides in said plunger chamber of said plunger guide; and locking means for securing said adjustable stud relative to said stop cover.

9. A dough divider according to claim 8 further wherein said stud is an elongated threaded member that is threaded to said housing.

10. A dough divider according to claim 8 wherein said locking means comprises:

a knob threaded to said stud externally to said housing for tightening against said housing to lock said stud in a position, said knob being generally star-shaped for manual turning.

11. A dough divider according to claim 8 wherein a crank handle is secured to an end of said stud.

12. A dough divider according to claim 8 further comprising a resilient bushing secured to said plunger for contacting said stud.

13. A dough divider according to claim 8 further comprising a slide on which said housing is mounted such that said slide can position said measuring cylinder to dispense said predetermined amount of dough.

14. A dough divider according to claim 8 wherein said means for pumping dough comprises:

a dough pumping cylinder in communication with said measuring cylinder;

an opening in said dough pumping cylinder; and a piston slidable within said dough pumping cylinder for drawing dough into said dough pumping cylinder through said opening and pushing dough from said dough pumping cylinder into said measuring cylinder against said plunger.

15. A dough divider comprising:

a means for supplying a flow of dough;

a measuring cup assembly formed of a stop cover, a plunger guide, and a measuring cylinder having a common central axis, said plunger guide and said stop cover being secured together in a fixed and nonadjustable manner, and said plunger guide and said measuring cylinder being secured together in a fixed and non-adjustable manner, said stop cover having an interior surface defining a cover chambers said plunger guide having an interior surface defining a plunger chamber and said measuring guide having an interior surface defining a measuring chamber;

a plunger having a face and a stem, said stem being aligned along said axis so that said plunger can reciprocate axially within said plunger chamber of said plunger guide;

an elongated stud threaded through said stop cover so that said stud is aligned axially with said stem;

a resilient bushing secured to said plunger stem in a position to receive contact with said stud; and a locking means for securing said elongated stud relative to said stop cover;

wherein said plunger slides in said plunger chamber of said plunger guide when dough is pressed against said plunger face, such that said plunger stem can contact said stud to limit the sliding of said plunger.

16. A dough divider according to claim 15 wherein said locking means comprises:

a manually turnable lock knob threaded to said stud for tightening against said housing to retain said stud in position, said lock knob being generally star-shaped in the form of a finger grip.

17. A dough divider according to claim 15 further comprising a crank handle secured to an end of said elongated stud for turning said stud.

18. A dough divider according to claim 15 further comprising a slide on which said housing is mounted for positioning said housing to dispense an amount of dough.

* * * * *